United States Patent
Morisada

(10) Patent No.: US 8,178,454 B2
(45) Date of Patent: May 15, 2012

(54) OPTICAL GLASS AND OPTICAL APPARATUS USING THE SAME

(75) Inventor: Naoyuki Morisada, Tokyo-to (JP)

(73) Assignee: Olympus Corporation, Tokyo (JP)

( * ) Notice: Subject to any disclaimer, the term of this patent is extended or adjusted under 35 U.S.C. 154(b) by 252 days.

(21) Appl. No.: 12/449,902

(22) PCT Filed: Apr. 4, 2008

(86) PCT No.: PCT/JP2008/056787
§ 371 (c)(1), (2), (4) Date: Sep. 1, 2009

(87) PCT Pub. No.: WO2008/126792
PCT Pub. Date: Oct. 23, 2008

(65) Prior Publication Data
US 2010/0029461 A1   Feb. 4, 2010

(30) Foreign Application Priority Data

Apr. 9, 2007  (JP) ................. 2007-101917
Dec. 26, 2007  (JP) ................. 2007-333919

(51) Int. Cl.
  C03C 3/068  (2006.01)
  C03C 3/066  (2006.01)
(52) U.S. Cl. ............ 501/78; 501/79; 252/301.4 R; 252/301.4 F; 252/582; 252/587; 252/588
(58) Field of Classification Search ............ 501/78, 501/79; 252/301.4 R, 301.4 F, 587, 588, 252/582
See application file for complete search history.

(56) References Cited

U.S. PATENT DOCUMENTS

| | | | | |
|---|---|---|---|---|
| 3,955,991 | A * | 5/1976 | Young et al. | 501/51 |
| 4,521,524 | A * | 6/1985 | Yamashita | 501/64 |
| 4,732,876 | A * | 3/1988 | Nagamine et al. | 501/78 |
| 5,288,669 | A * | 2/1994 | Grateau et al. | 501/78 |
| 6,818,578 | B2 * | 11/2004 | Tachiwama | 501/78 |
| 7,855,158 | B2 * | 12/2010 | Fujiwara | 501/79 |
| 2002/0006857 | A1 * | 1/2002 | Tachiwama | 501/78 |
| 2005/0085371 | A1 * | 4/2005 | Tachiwama | 501/78 |
| 2005/0107240 | A1 * | 5/2005 | Uehara | 501/78 |
| 2007/0232477 | A1 * | 10/2007 | Fujiwara | 501/50 |
| 2008/0293556 | A1 * | 11/2008 | Fujiwara | 501/78 |
| 2010/0255981 | A1 * | 10/2010 | Morisada | 501/78 |
| 2010/0271830 | A1 * | 10/2010 | Morisada | 362/317 |

FOREIGN PATENT DOCUMENTS

| | | |
|---|---|---|
| JP | 01-320236 | 12/1989 |
| JP | 04-219342 | 8/1992 |
| JP | 2000-128570 | 5/2000 |
| JP | 2002-012443 | 1/2002 |
| JP | 2004-175632 | 6/2004 |
| JP | 2007-008782 | 1/2007 |
| WO | 02/14235 | 2/2002 |

* cited by examiner

*Primary Examiner* — Karl Group
*Assistant Examiner* — Elizabeth A Bolden
(74) *Attorney, Agent, or Firm* — Kenyon & Kenyon LLP

(57) ABSTRACT

An optical glass includes a substance A generating light of a wavelength $\lambda 2$ when irradiated with light of a wavelength $\lambda 1$ and a substance B generating light of a wavelength $\lambda 3$ when irradiated with light of the wavelength $\lambda 1$ in the case where the optical glass includes 5-50 ppm Fe with respect to a 100% basic glass composition containing at least, 2-10% $SiO_2$, 5-45% $B_2O_3$, and 30-60% $La_2O_3$, by weight, or the relation of the wavelength $\lambda 1$, the wavelength $\lambda 2$, and the wavelength $\lambda 3$ is assumed to be $\lambda 1 < \lambda 2 < \lambda 3$ with respect to a 100% basic glass composition containing; at least, 2-10% $SiO_2$, 5-45% $B_2O_3$, 30-60% $La_2O_3$, 0-15% RO (R=Zn, Sr, Ba), 0-40% $Ln_2O_3$ (Ln=Y, Gd), and 0-30% total of $ZrO_2+Nb_2O_5+Ta_2O_5$, by weight.

5 Claims, 3 Drawing Sheets

OPTICAL GLASS AND OPTICAL APPARATUS USING THE SAME

TECHNICAL FIELD

This invention relates to an optical glass, and in particular, an optical glass used in an optical system for a fluorescence observation and a fluorescence intensity measurement, and an optical apparatus using this optical glass.

BACKGROUND ART

An optical glass of high-index and low-dispersion properties is useful for favorably correcting aberration in an optical system. Such an optical glass is therefore used in the optical system (the lens) of an optical instrument. The optical glass of high-index and low-dispersion properties is set forth, for example, in Japanese Patent Kokai No. 2007-8782. This optical glass includes $SiO_2$, $B_2O_3$, and $La_2O_3$ as a basic composition.

As an example of the optical instrument, a fluorescence microscope is cited. In the fluorescence microscope, the observation and measurement of a specimen are carried out by fluorescent light generated from the specimen. In recent years, the fluorescence microscope has come to be used for an observation with fainter fluorescent light, for example, a single-molecule fluorescence observation, and the fluorescence intensity measurement of a specimen with low fluorescence intensity. Such an application needs the observation of a fluorescent image of higher contrast or a high degree of measurement accuracy.

Here, in the observation of the fluorescent image (a specimen image) and the measurement of the amount of fluorescent light, auto-fluorescence from glass used for the lens of the optical system is known as one of causes of the deterioration of image contrast and measurement accuracy.

The auto-fluorescence refers to fluorescent light emanating from glass. The auto-fluorescence is generated by the fact that when excitation light exciting the specimen passes through the lens, part of the excitation light is absorbed into the glass of lens material. The wavelength of the auto-fluorescence sometimes nearly coincides with that of the fluorescent light emanating from the specimen. In this case, if the intensity of the auto-fluorescence is greater than that of the fluorescent light emanating from the specimen, the information of a dark portion (a portion in which the fluorescence intensity is low) of the fluorescent image will be lost, for instance.

In this way, the auto-fluorescence reduces the contrast of the fluorescent image of the specimen. As a result, in an observation apparatus in which the auto-fluorescence is generated, a good observation of the fluorescent image becomes difficult. Moreover, in the fluorescence intensity measurement, the auto-fluorescence becomes a background noise. Consequently, in a measurement apparatus in which the auto-fluorescence is generated, it becomes difficult to make is a measurement with a higher degree of accuracy in the specimen of a low fluorescence intensity.

DISCLOSURE OF THE INVENTION

As mentioned above, the fluorescence microscope is used for the observation of the fluorescent image and the measurement of the intensity of fluorescent light. In order to favorably correct aberration, the optical glass of high-index and low-dispersion properties is also used for the lens of the optical system of the fluorescence microscope. The optical glass of high-index and low-dispersion properties, however, is liable to generate the auto-fluorescence. As such, the fluorescence microscope using the optical glass of high-index and low-dispersion properties has the problem that the observation of the fluorescent image of high contrast and the measurement with a high degree of accuracy become difficult.

It is, therefore, an object of the present invention to provide an optical glass in which the intensity of the auto-fluorescence is made lower than a conventional one and an optical apparatus using this optical glass.

In order to achieve the above object, the optical glass of the present invention comprises a substance A generating light of a wavelength $\lambda 2$ when irradiated with light of a wavelength $\lambda 1$ and a substance B generating light of a wavelength $\lambda 3$ when irradiated with light of the wavelength $\lambda 1$ in the case where the relation of the wavelength $\lambda 1$, the wavelength $\lambda 2$, and the wavelength $\lambda 3$ is assumed to be $\lambda 1 < \lambda 2 < \lambda 3$ with respect to a 100% basic glass composition containing: at least,

| | |
|---|---|
| $SiO_2$ | 2-10% |
| $B_2O_3$ | 5-45%, and |
| $La_2O_3$ | 30-60% by weight. |

In another aspect of the present invention, the optical glass of the present invention comprises a substance A generating light of a wavelength $\lambda 2$ when irradiated with light of a wavelength $\lambda 1$ and a substance B generating light of a wavelength $\lambda 3$ when irradiated with light of the wavelength $\lambda 1$ in the case where the relation of the wavelength $\lambda 1$, the wavelength $\lambda 2$, and the wavelength $\lambda 3$ is assumed to be $\lambda 1 < \lambda 2 < \lambda 3$ with respect to a 100% basic glass composition containing:

| | |
|---|---|
| $SiO_2$ | 2-10% |
| $B_2O_3$ | 5-45% |
| $La_2O_3$ | 30-60% |
| RO (R = Zn, Sr, Ba) | 0-15% |
| $Ln_2O_3$ (Ln = Y, Gd) | 0-40%, and |
| $ZrO_2 + Nb_2O_5 + Ta_2O_5$ | 0-30% by weight. |

In another aspect of the present invention, the substance B is Fe and an Fe content is 5-50 ppm.

In another aspect of the present invention, the optical glass comprises:

| | |
|---|---|
| Fe | 5-50 ppm |
| with respect to a 100% basic glass composition containing; at least, | |
| $SiO_2$ | 2-10% |
| $B_2O_3$ | 5-45%, and |
| $La_2O_3$ | 30-60% by weight. |

In another aspect of the present invention, the optical glass comprises:

| | |
|---|---|
| Fe | 5-50 ppm |
| with respect to a 100% basic glass composition containing; | |
| $SiO_2$ | 2-10% |
| $B_2O_3$ | 5-45% |
| $La_2O_3$ | 30-60% |
| RO (R = Zn, Sr, Ba) | 0-15% |
| $Ln_2O_3$ (Ln = Y, Gd) | 0-40%, and |
| $ZrO_2 + Nb_2O_5 + Ta_2O_5$ | 0-30% by weight. |

In another aspect of the present invention, the optical glass comprises 0.01-1% at least one of $Sb_2O_3$, chloride, sulfide, and fluoride, by weight, as an antifoaming agent, with respect to the 100% basic glass composition.

In another aspect of the present invention, the optical glass comprises 0-10% at least one of $Li_2O$, $Na_2O$, $K_2O$, $Rb_2O$, and $Cs_2O$, by weight.

The optical apparatus of the present invention is provided with an optical system having the optical glass mentioned above.

According to the present invention, it is possible to realize an optical glass in which the intensity of the auto-fluorescence is made lower than a conventional one and an optical apparatus using this optical glass.

BEST MODE FOR CARRYING OUT THE INVENTION

Figure 1:
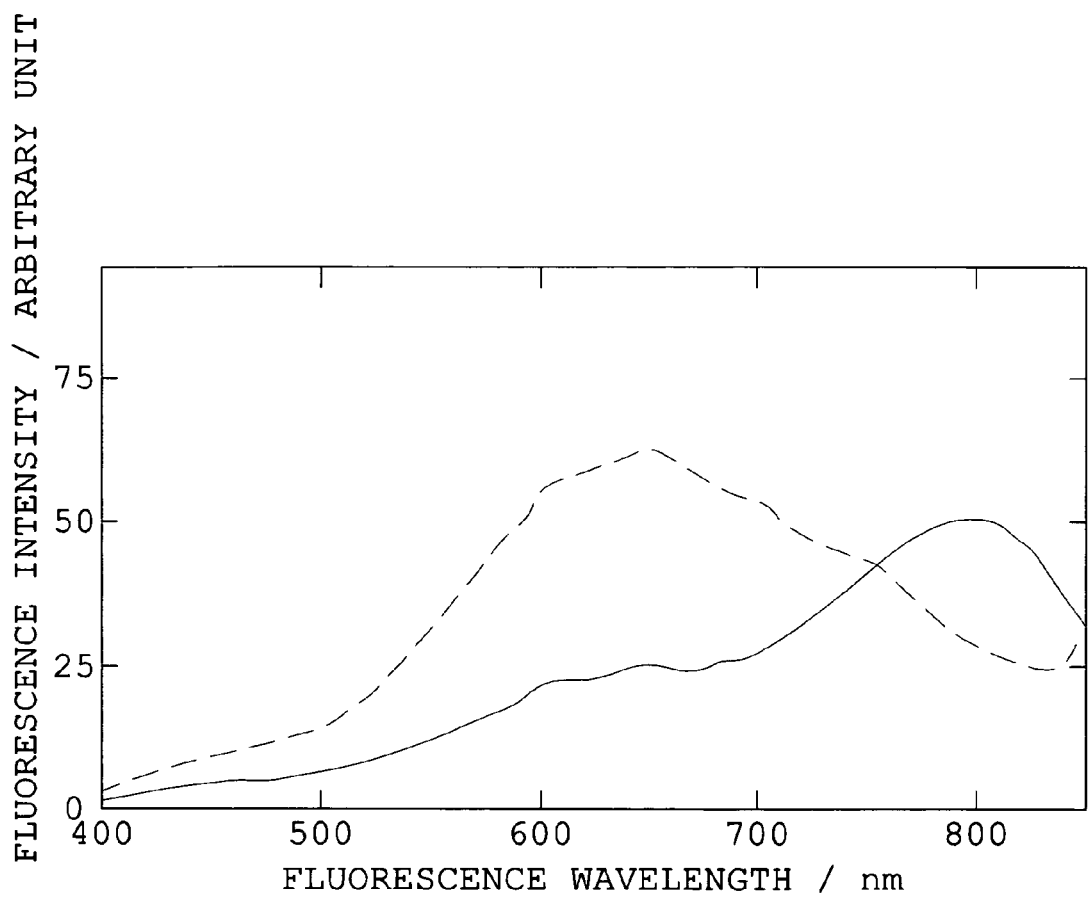
FIG. 1 is a diagram showing the spectral characteristics of auto-fluorescence, in which a solid line indicates the auto-fluorescence from the optical glass of the present invention, while a broken line indicates the auto-fluorescence from a conventional optical glass.

The present invention provides the optical glass containing the composition described above. What follows is a description of the role of each glass component and the reason for the determination of the optimum content of each component.

The optical glass of the first aspect includes $SiO_2$, $B_2O_3$, and $La_2O_3$ as a basic glass composition.

$SiO_2$ is one of glass network formers. The optical glass of this aspect contains 2-10% $SiO_2$. Below 2%, the chemical durability of the glass is degraded. On the other hand, beyond 10%, the stability of the glass is impaired and a tendency to crystallization becomes pronounced.

$B_2O_3$ is one of glass network formers. The optical glass of the present aspect contains 5-45% $B_2O_3$. Below 5%, the stability and solubility of the glass are deteriorated. Beyond 45%, the chemical durability is degraded.

$La_2O_3$ is a component for increasing the refractive index. The optical glass of the present aspect contains 30-60% $La_2O_3$. Below 30%, a desired refractive index is not obtained. On the other hand, beyond 60%, the stability of the glass is impaired.

The optical glass of a second aspect includes RO, $Ln_2O_3$, $ZrO_2$, $Nb_2O_5$, and $Ta_2O_5$, in addition to the three components mentioned above, as the basic glass composition.

RO is R=Zn, Sr, and Ba and indicates ZnO, SrO, and BaO. RO is a component for controlling the refractive index and stability of the glass. The optical glass of the present aspect contains at least one of ZnO, SrO, and BaO. The optical glass of the present aspect contains 0-15% RO (R=Zn, Sr, and Ba). Beyond 15%, the stability and chemical durability of the glass is impaired.

$Ln_2O_3$ is Ln=Y and Gd and indicates $Y_2O_3$ and $Gd_2O_3$. $Y_2O_3$ and $Gd_2O_3$ are components increasing the refractive index and controlling a dispersion value. The optical glass of the present aspect includes at least one of $Y_2O_3$ and $Gd_2O_3$.

The optical glass of the present aspect contains 0-40% $Ln_2O_3$ (Ln=Y and Gd). Beyond 40%, the stability of the glass is impaired and the tendency to crystallization becomes pronounced.

$ZrO_2$, $Nb_2O_5$, and $Ta_2O_5$ are components increasing the refractive index and controlling the dispersion value. The optical glass of the present aspect contains 0-30% total of $ZrO_2$, $Nb_2O_5$, and $Ta_2O_5$. Beyond 30%, the solubility is deteriorated and the stability of the glass is impaired.

When the relation of the wavelength $\lambda 1$, the wavelength $\lambda 2$, and the wavelength $\lambda 3$ is assumed to be $\lambda 1 < \lambda 2 < \lambda 3$ with respect to a 100% basic glass composition, the optical glass of each of the first and second aspects includes the substance A generating light of the wavelength $\lambda 2$ when irradiated with light of the wavelength $\lambda 1$ and the substance B generating light of the wavelength $\lambda 3$ when irradiated with light of the wavelength $\lambda 1$.

The substance A is the one generating the light of the wavelength $\lambda 2$ when irradiated with the light of the wavelength $\lambda 1$. Here, the wavelength $\lambda 2$ is the one of auto-fluorescence generated from the substance A. The light of the wavelength $\lambda 1$ is the excitation light and has the relation of $\lambda 1 < \lambda 2$.

The substance A generates the auto-fluorescence and thus has been called the impurity. The substance A, for example, as disclosed in Japanese Patent Kokai No. Hei 4-219342, is $As_2O_3$, $Sb_2O_3$, $V_2O_5$, CuO, or $CeO_2$, or as disclosed in Japanese Patent Kokai No. Hei 1-320236, is platinum or antimony. Such a substance A, when excited with the excitation wavelength $\lambda 1$, generates the auto-fluorescence of the wavelength $\lambda 2$. On the other hand, the specimen, when excited with the excitation wavelength $\lambda 1$, also generates fluorescent light of a wavelength $\lambda S$. In this case, the wavelength $\lambda 2$ nearly coincides with the wavelength $\lambda S$.

On the other hand, the substance B is the one generating the light of the wavelength $\lambda 3$ when irradiated with the light of the wavelength $\lambda 1$. Here, the wavelength $\lambda 3$ is the one of auto-fluorescence generated form the substance B. The light of the wavelength $\lambda 1$ is the excitation light and has the relation of $\lambda 1 < \lambda 3$.

In this way, the substance B also generates the auto-fluorescence. Hence, the substance B, like the substance A, can also be thought of as the impurity. However, the substance B differs from the substance A in that the wavelength $\lambda 3$ of the auto-fluorescence generated by the substance B is longer than the wavelength $\lambda 2$ of the auto-fluorescence generated by the substance A. Specifically, the relation of $\lambda 1 < \lambda 2 < \lambda 3$ is established.

Here, the wavelength $\lambda 2$ of the auto-fluorescence generated by the substance A practically coincides with the wavelength $\lambda S$ of the fluorescent light emanating from the specimen. It follows from this that the wavelength $\lambda 3$ of the auto-fluorescence generated by the substance B is longer than the wavelength $\lambda S$ of the fluorescent light emanating from the specimen.

In this case, even though the fluorescent light (the fluorescent light emanating from the specimen) of the wavelength $\lambda S$ and the fluorescent light (the auto-fluorescence generated by the substance B) of the wavelength $\lambda 3$ are superposed on the optical path, such superposed light can be separated by an optical filter. Thus, even when the observation of the fluorescent image is carried out under the fluorescence microscope, the contrast of the fluorescent image is not impaired by the auto-fluorescence generated by the substance B. Further, even when the fluorescence intensity is measured under the fluorescence microscope, the measurement accuracy is not deteriorated by the auto-fluorescence generated by the substance B.

In addition, the substance B exists in the optical glass and thereby part of the excitation light incident on the optical glass is absorbed by the substance B (and as a result, the auto-fluorescence is generated from the substance B). This means that the proportion of the excitation light absorbed by the substance A becomes smaller than in a state where all of the incident excitation light has been absorbed by the substance A in conventional practice. Hence, the intensity (the amount of light) of the auto-fluorescence generated by the substance A can be made lower than in the conventional practice. Consequently, a decrease in contrast of the fluorescent image and the deterioration of the measurement accuracy of the fluorescence intensity can be suppressed, compared with the conventional practice.

Also, it is desirable that the substance B, when excited by a wavelength of 400 nm or less ($\lambda 1 \leq 400$ nm), generates fluorescent light with a wavelength of 750 nm or more ($\lambda 3 \geq 750$ nm).

It is desirable that the optical glass of each of the first and second aspects contains 5-50 ppm Fe with respect to the 100% basic glass composition.

Fe is a component effective for reducing the intensity of the auto-fluorescence. In Fe, the wavelength $\lambda 3$ of the auto-fluorescence lies on the long-wavelength side (for example, of 750 nm or more), compared with the wavelength (for example, $\lambda 2=600\text{-}650$ nm) of the auto-fluorescence of the substance A.

FIG. 1 shows the spectral characteristics of the auto-fluorescence. Here, the solid line indicates the case where Fe is contained, while the broken line indicates the case where it is not contained. Comparison of the broken line with the solid line shows that, in the solid line, the fluorescence intensity decreases at a wavelength of 650 nm ($\lambda 2$) and increases at a wavelength of 800 nm ($\lambda 3$). As such, Fe is also a substance corresponding to the substance B.

In this way, according to the optical glass of the present aspect, Fe is contained and thereby even though various impurities contained in the glass is not lessened, the amount of generation of the auto-fluorescence due to the impurities can be reduced.

Here, when the content (the content ratio) of Fe is less than 5 ppm, the effect of reducing the intensity of the auto-fluorescence is small. On the other hand, when it is more than 50 ppm, the transmittance of light with a short wavelength less than 400 nm is lowered. Consequently, when the specimen is excited with light of a short wavelength less than 400 nm, the loss of light due to the glass becomes pronounced.

As mentioned above, the greatest advantage of the optical glass of the present aspect lies in the fact that the substance B or Fe is contained in the glass. Here, when the substance contained in the glass is Fe, the content (the content ratio) of Fe is as low as 5-50 ppm.

In this case, optical properties of transmittances, refractive indices, and dispersions at wavelengths of 400-700 nm are almost the same as those of the optical glass which does not contain Fe. The optical glass of the present aspect can, therefore, be easily replaced with the optical glass which does not contain Fe. Specifically, in the case where the optical glass of the present aspect is used, there is no need to make the design of a new optical system or the design changes of conventional optical systems.

Chemical, thermal, and mechanical properties are also almost the same as those of the optical glass which does not contain Fe. Consequently, in the case where the optical glass is manufactured, there is no need to change the processes of machining and coating. That is, the optical glass can be used and manufactured in the same way as the glass of the conventional optical system.

As raw material required for manufacturing the optical glass, the one for a conventional common optical glass can be used, and hence a rise in product cost is avoided. In addition, since the optical glass can be manufactured by using conventional facilities and processes, special facilities and processes are unnecessary, and in this respect also, the cost can be reduced.

Even when high-purity raw material is used to lessen the auto-fluorescence caused by the impurity, the low-fluorescence glass of the present invention is manufactured and thereby the intensity of the auto-fluorescence can also be further lowered.

Subsequently, reference is made to the optical glass of a third aspect. The optical glass of the third aspect includes 0.01-1% at least one of $Sb_2O_3$, chloride, sulfide, and fluoride, as an antifoaming agent in the optical glass of each of the first and second aspects. By doing so, the foam produced by the decomposition and reaction of the raw material when the glass is melted can be lessened. Below 0.01%, an antifoaming effect is not secured. On the other hand, beyond 1%, the problem arises that the auto-fluorescence is increased.

Next, reference is made to the optical glass of a fourth aspect. The optical glass of the fourth aspect includes 0-10% at least one of $Li_2O$, $Na_2O$, $K_2O$, $Rb_2O$, and $Cs_2O$ which are alkali metal oxides in the optical glass of each of the first to third aspects. By doing so, the solubility of the glass can be improved. Beyond 10%, the chemical durability and stability of the glass is deteriorated. Also, it is desirable to include a plurality of alkali metal oxides.

Also, it is also possible to include other components in the optical glass of this aspect for purposes of improving the antifoaming effect, solubility, and stability. However, CaO is not included in any aspect. In other words, the optical glass of the present aspect is the one which does not include CaO.

Subsequently, a fluorescence observation measurement apparatus of the present invention will be explained.

The optical apparatus of the present invention refers to, for example, a fluorescence, microscope, a living cell observation apparatus, a gene analysis apparatus, a photoluminescence measurement apparatus, a fluorescence spectrophotometer, a fluorescence lifetime measurement apparatus, a plasma display panel examination apparatus, or an endoscope having a fluorescence observation function. In any case, it is an apparatus observing or measuring the fluorescent light.

This optical apparatus is such as to observe and/or measure the fluorescent light emanating from the specimen. In order to make the fluorescent light emanate from the specimen, the specimen is irradiated through the optical system with excitation light emitted from a light source. By the irradiation of this excitation light, the fluorescent light is made to emanate from the specimen. The fluorescent light is detected through the optical system by a photodetector (such as a photodiode, photomultiplier tube, CCD, or CMOS).

The optical system mentioned above contains optical parts, such as lenses, prisms, mirrors, filters, etc., made from optical glass. The optical glass of the present aspect is used for each of these optical parts and thereby the intensity (the amount of light) of the auto-fluorescence generated from each part can be lowered. As a result, in the fluorescence observation, a decrease in contrast of the fluorescent image can be suppressed. Moreover, in the fluorescence measurement, a noise component (the auto-fluorescence) in a fluorescence signal can be reduced.

Embodiment 1

Subsequently, the optical glass of Embodiment 1 is shown in Table 1 as Test examples 1-10. In Embodiment 1, ten kinds of glass examples are prepared and the amounts of fluorescent light of individual examples are measured. Also, each of compositions in Table 1 is expressed by the percentage based on the weight.

In the optical glass of this embodiment, the same glass materials as in the conventional ones are used. The glass materials, after being mixed so that a preset ratio is obtained, are molten at 1100-1400° C. in a platinum crucible for 2-5 hours and are annealed. The glass prepared in this way is fabricated into a square pillar of 11×11×40 mm so that four faces (faces of 11×40 mm) in a longitudinal direction are specularly polished and the optical glass is obtained.

This optical glass is used and the fluorescence intensity is measured by the fluorescence spectrophotometer (FP6500, made by JASCO Corporation). In the measurement, the optical glass of each example is irradiated with light of wavelength 365 nm to measure the fluorescence intensity at wavelength 400-700 nm. A value (an arbitrary unit) integrating the fluorescence intensity at wavelength 400-700 nm is taken as the intensity of the auto-fluorescence.

Table 2 shows the result of measurement of the intensity of the auto-fluorescence made in the same way with respect to the optical glass which does not contain Fe, as comparative examples 1-3.

Table 3 shows one example of the result of measurement of the intensity of the auto-fluorescence in which components other than Fe are made identical and the additional amount of Fe is changed.

The amount of emitted light shown in the last row of each of Tables 1 and 2 is a numerical value of the result that when the intensity of the auto-fluorescence of Comparative example 1 is taken as 1, the intensity of the auto-fluorescence of another example are relatively calculated. From this result, it is confirmed that the optical glass of the present embodiment is lower in the intensity of the auto-fluorescence than that of each of Comparative examples 1-3. Furthermore, from Table 3, it is confirmed that the additional amount of Fe is increased and thereby the intensity of the auto-fluorescence is reduced.

In the optical glass of the present embodiment, the refractive index (nd) is in the range from 1.75 to 2.10 and the Abbe's number (vd) is in the range from 28 to 50. In particular, the optical glass of the present embodiment has a preferred optical property as the top lens of the objective lens used in the fluorescence microscope.

Also, what aspect corresponds to individual Test examples is as shown below.

First aspect: Test examples 1-10
Second aspect: Test examples 1-10
Third aspect: Test examples 3, 4, 6, 8, 9, and 10
Fourth aspect: Test examples 1-10

TABLE 1

| | Test example/weight % | | | | | | | | | |
|---|---|---|---|---|---|---|---|---|---|---|
| | 1 | 2 | 3 | 4 | 5 | 6 | 7 | 8 | 9 | 10 |
| $SiO_2$ | 3 | 3.5 | 7 | 10 | 8 | 2 | 6.5 | 2 | 5.5 | 8 |
| $B_2O_3$ | 35 | 30 | 35 | 33.9 | 10.5 | 43 | 37 | 45 | 31 | 2 |
| $La_2O_3$ | 43.5 | 45 | 40 | 34 | 40 | 43.9 | 36 | 31 | 42 | 50 |
| ZnO | 2 | 2 | | 1.95 | 2.5 | 1 | 2 | 2.5 | 7.95 | 1.98 |
| SrO | | 1 | | | | 1 | 1 | 2.4 | 1 | 1 |
| BaO | | | 1 | | | | | | 2 | 1 |
| $Y_2O_3$ | 9.5 | 8.5 | 11.8 | 15 | | 5 | 8 | 2 | 7.5 | 8 |
| $Gd_2O_3$ | | 6 | | | 16 | | | 9 | | |
| $ZrO_2$ | 7 | 2 | 5 | 3 | 5 | 2 | | 4 | | 6 |
| $Nb_2O_5$ | | | | 1 | 1 | | 1.5 | | 3 | 3 |
| $Ta_2O_5$ | | | | | 17 | | | | | |
| $Sb_2O_3$ | | | | 0.05 | | 0.05 | | | | 0.02 |
| NaCl | | | 0.1 | | | | | | | |
| $Na_2SO_4$ | | | | | | | | 0.1 | | |
| NaF | | | | | | 0.05 | | | 0.05 | |
| $Li_2O$ | | | 0.1 | 0.1 | | | | 1 | | |
| $Na_2O$ | | 1 | | 1 | | | 3 | | | |
| $K_2O$ | | 1 | | | | | 5 | | | |
| $Rb_2O$ | | | | | | 1 | | | | |
| $Cs_2O$ | | | | | | 1 | | 1 | | |
| Fe/ppm | 50 | 45 | 45 | 40 | 30 | 35 | 25 | 20 | 10 | 5 |
| Amount of emitted light | 0.35 | 0.42 | 0.40 | 0.37 | 0.48 | 0.50 | 0.49 | 0.51 | 0.63 | 0.61 |

TABLE 2

| | Comparative example/weight % | | |
|---|---|---|---|
| | 1 | 2 | 3 |
| $SiO_2$ | 3.0 | 3.0 | 3.5 |
| $B_2O_3$ | 35.0 | 35.0 | 24.0 |
| $La_2O_3$ | 43.5 | 40.95 | 46.0 |
| ZnO | 2.0 | 2.0 | 2.0 |
| SrO | | | 1.5 |
| BaO | | | |
| $Y_2O_3$ | 9.5 | 9.0 | 9.5 |
| $Gd_2O_3$ | | | 2.0 |
| $ZrO_2$ | 7.0 | 7.0 | 6.45 |
| $Nb_2O_5$ | | | 2.0 |
| $Ta_2O_5$ | | 3.0 | |
| $Sb_2O_3$ | | 0.05 | |
| NaCl | | | |
| $Na_2SO_4$ | | | 0.05 |
| NaF | | | |
| $Li_2O$ | | | |
| $Na_2O$ | | | 2.0 |
| $K_2O$ | | | 1.0 |
| $Rb_2O$ | | | |
| $Cs_2O$ | | | |

TABLE 2-continued

| | Comparative example/weight % | | |
|---|---|---|---|
| | 1 | 2 | 3 |
| Fe/ppm | 0 | 0 | 0 |
| Amount of emitted light | 1.00 | 1.05 | 1.08 |

TABLE 3

| | Fe/ppm | | | | | | | | |
|---|---|---|---|---|---|---|---|---|---|
| | 1 | 4 | 5 | 10 | 25 | 45 | 50 | 55 | 100 |
| Amount of emitted light | 0.92 | 0.84 | 0.75 | 0.65 | 0.49 | 0.43 | 0.41 | 0.40 | 0.37 |

Embodiment 2

Figure 2:
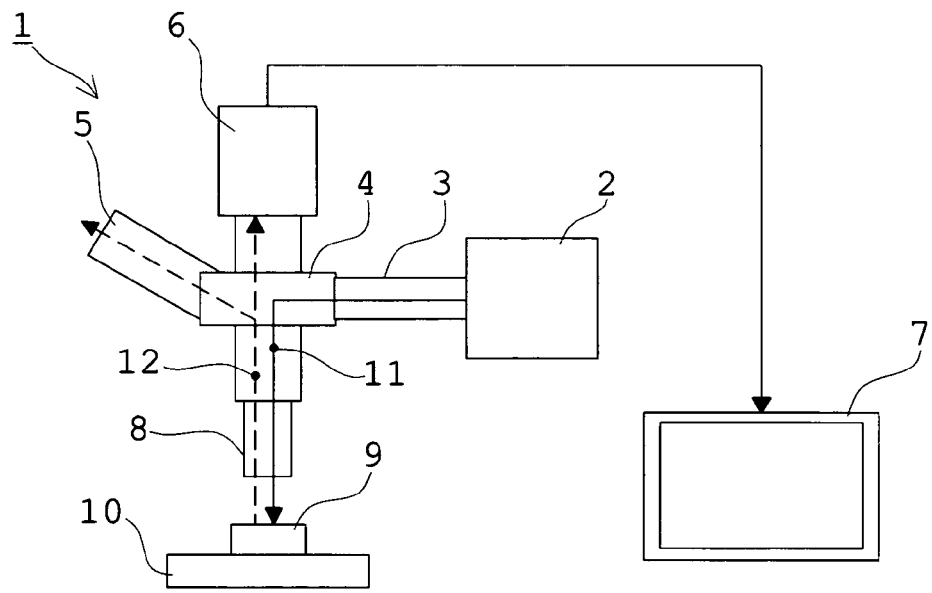
FIG. 2 is an explanatory view showing schematically a fluorescence microscope in Embodiment 1 of an optical apparatus of the present invention.

Subsequently, one embodiment of the optical apparatus of the present invention will be explained in accordance with FIG. 2. FIG. 2 is an explanatory view showing schematically a fluorescence microscope 1 of the optical apparatus of the present invention. The fluorescence microscope 1 includes an excitation light source section 2, an excitation light optical system 3, a filter section 4, an ocular optical system 5, an image photographing section 6, a display device 7, an objective lens 8, and a specimen base 10. Reference numeral 9 represents a specimen (a sample).

The excitation light source section 2 is provided with a xenon lamp emitting excitation light 11 and a power source device, not shown. The excitation light optical system 3, which conducts the excitation light 11 to the specimen 9, is interposed between the excitation light source section 2 and the filter section 4. The filter section 4 is constructed with a dielectric multilayer film filter. The filter section 4 has a band-pass filter and a dichroic mirror. The dichroic mirror has properties of reflecting the excitation light 11 and transmitting fluorescent light 12.

The ocular optical system 5 is provided to observe the image (the fluorescent image) of the specimen 9 with the naked eye. The image photographing section 6 is a CCD camera photographing the image of the fluorescent light 12. The display device 7 displays the photographed image of the fluorescent light 12. The objective lens 8 collects the excitation light 11 on the specimen 9 and condenses the fluorescent light 12 at a preset position to form an image. The specimen base is adapted to place the specimen 9 thereon.

Light emitted from the excitation light source section 2 passes through the excitation light optical system 3 and is incident on the filter section 4. In the filter section 4, a band-pass filter transmitting light with wavelengths of 330-385 nm is placed. Hence, the light emitted from the excitation light source section 2 passes through the filter section 4 and thereby the light with wavelengths of 330-385 nm, namely, the excitation light 11, is obtained.

Next, the excitation light 11 is incident on the dichroic mirror, which has properties of reflecting light of wavelengths of 400 nm or less and transmitting light of wavelengths longer than 400 nm. The dichroic mirror is provided at an angle of 45° with respect to the traveling direction of the excitation light 11. The excitation light 11 incident on the dichroic mirror is therefore bent at 90° and introduced into the objective lens 8.

The excitation light 11 is collected by the objective lens 8 to irradiate the specimen 9 provided on the specimen base 10. The excitation light 11 is absorbed by the specimen 9 (the fluorescent material), and the fluorescent light 12 emanates from the specimen 9.

The fluorescent light 12 is collected by the objective lens 8. The fluorescent light 12 thus collected is incident on the dichroic mirror of the filter section 4. Here, the wavelength of the fluorescent light 12 is longer than 400 nm. Consequently, the fluorescent light 12 is transmitted through the dichroic mirror. Further, the fluorescent light 12, after passing through a filter transmitting light of wavelengths longer than 420 nm, is collected at a preset position to form a fluorescent image. This fluorescent light is then observed by the ocular optical system 5.

The fluorescence microscope 1 may be provided with a path switching mechanism (not shown). The optical path is switched by the path switching mechanism and thereby the fluorescent light 12 can be introduced into the image photographing section 6. In this way, a fluorescent image can be photographed by the image photographing section 6. The fluorescent image thus photographed is displayed on the display device 7.

In this embodiment, the auto-fluorescence which constitutes a noise is generated at the filter section 4 and the objective lens 8. In the present embodiment, the optical glass of Embodiment 1 (the optical glass of any of Test examples 1-10) is used for a part of optical lenses used in the objective lens 8. Whereby, the auto-fluorescence generated at the objective lens 8 can be reduced. As a result, the contrast of the fluorescent image is increased and a sharp fluorescent image can be obtained.

Embodiment 3

Figure 3:
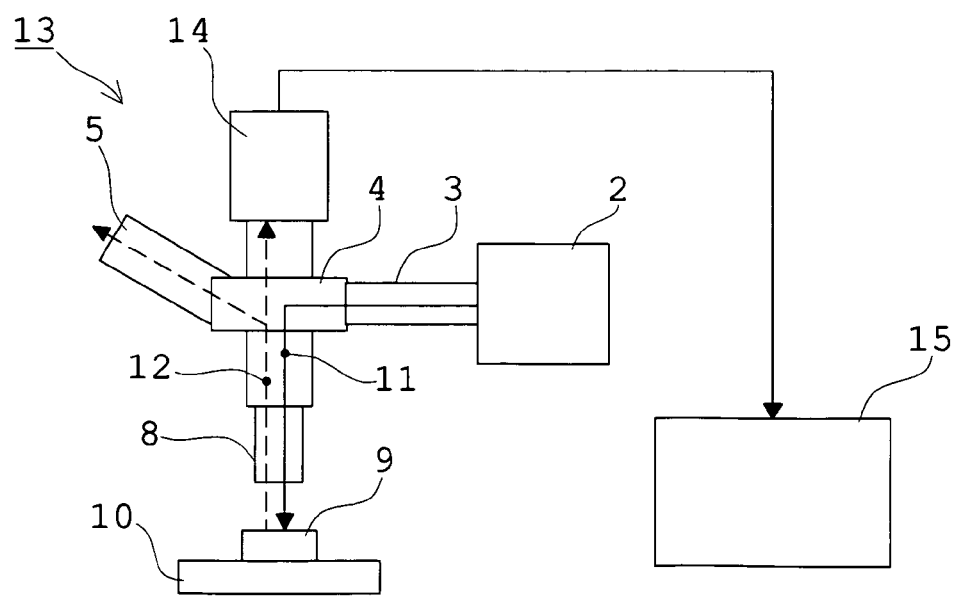
FIG. 3 is an explanatory view showing schematically the fluorescence microscope of the present invention.

Subsequently, another embodiment of the optical apparatus of the present invention will be explained in accordance with FIG. 3. FIG. 3 is an explanatory view showing schematically a fluorescence microscope 13 of the optical apparatus of the present invention. The fluorescence microscope 13 has the same structure as the fluorescence microscope 1 of FIG. 2 with the exception that the image photographing section 6 is replaced by a photodetector section 14, and thus its detailed description is omitted. Also, the photodetector section 14 has a photomultiplier tube measuring the intensity of the fluorescent light 12 and a power device, not shown.

The fluorescent light 12 is transmitted through the dichroic mirror of the filter section 4 and passes through the filter transmitting light of wavelengths longer than 420 nm. The fluorescent light 12 is then incident on the photodetector section 14. In the photodetector section 14, the intensity of the light (the intensity of the fluorescent light) is measured as a current value, which is displayed on a display device 15.

In this case, the auto-fluorescence which constitutes the noise is generated at the filter section 4 and the objective lens 8. Here, when the measurement of the intensity of the fluorescent light is done without placing the specimen 9 on the specimen base 10, the auto-fluorescence generated at the filter section 4 and the objective lens 8 is measured.

In the present embodiment, the optical glass of Embodiment 1 is used for a part of glasses used in the objective lens 8. The measurement of the intensity of the fluorescent light is done without placing the specimen 9 on the specimen base 10. In addition, the objective lens 8 using the conventional optical glass is used to make the measurement of the intensity of the fluorescent light.

As a result, in the case of the objective lens 8 using the optical glass of Embodiment 1, the measured value of the intensity of the fluorescent light (an arbitrary unit) is 4.0. In contrast to this, the measured value of the intensity of the fluorescent light (an arbitrary unit) in the case of the objective lens 8 using the conventional optical glass is 7.9. In this way, the intensity of the auto-fluorescence in the optical glass of Embodiment 1 is reduced to about ½ over the conventional one. Hence, the background noise can be made lower than in the fluorescence microscope of the prior art.

Embodiment 4

Figure 4:
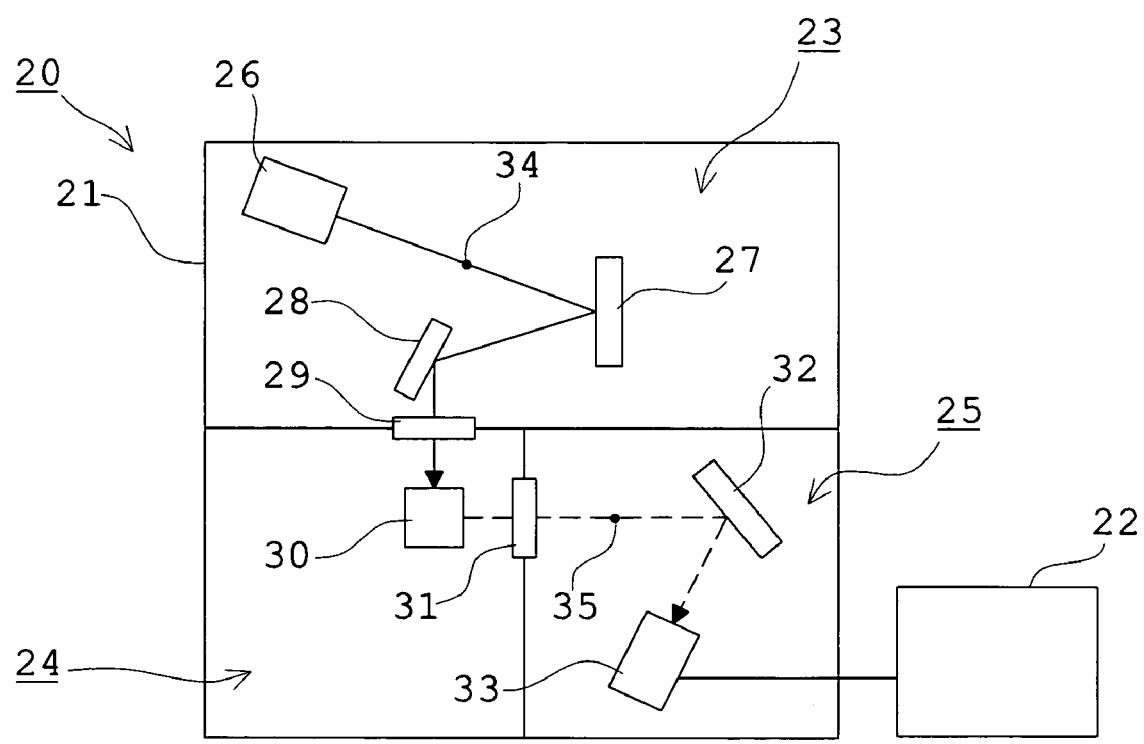
FIG. 4 is an explanatory view showing the structure of a fluorescence spectrophotometer of the present invention.

Subsequently, still another embodiment of the optical apparatus of the present invention will be explained in accordance with FIG. 4. FIG. 4 is an explanatory view showing the structure of a fluorescence spectrophotometer 20 which is the optical apparatus of the present invention. The fluorescence spectrophotometer 20 comprises a photometer body 21, a control and analysis section 22, and a power source, not shown.

The photometer body 21 converts the irradiation of excitation light 34 to the specimen and fluorescent light 35 emanating from the specimen into intensity signals. The control and analysis section 22 performs the control of the photometer body 21 and the display and analysis of the measured intensity of the fluorescent light.

The photometer body 21 includes an excitation light optical system 23, a specimen chamber 24, and a fluorescence optical system 25. The excitation light optical system 23 has a xenon lamp 26 emitting the excitation light 34, an excitation light diffraction grating 27 producing the spectrum of the excitation light 34, a mirror 28 changing the direction of the excitation light 34 toward the specimen, and an excitation light exit window 29 partitioning a space with respect to the specimen chamber 24. The excitation light exit window 29 uses the optical glass of Embodiment 1.

The reason for partitioning the space into the specimen chamber 24 and the excitation light optical system 23 is to prevent the contamination of the excitation light optical system 23 caused by the penetration of foreign matter from the specimen chamber 24. For the same reason, the fluorescence optical system 25 described later is such that the space is partitioned by a fluorescence entrance window 31 with respect to the specimen chamber 24.

The fluorescence optical system 25 has the light entrance window 31, a fluorescence diffraction grating 32, and a photomultiplier tube 33. The light entrance window 31 is provided at the position where the fluorescent light 35 emanating from a specimen 30 is incident on the fluorescence optical system 25. The fluorescence diffraction grating 32 produces the spectrum of the incident fluorescent light 35. The photomultiplier tube 33 converts the intensity of spectral fluorescent light into the electric current. Here, the optical glass of Embodiment 1 is used for the fluorescence entrance window 31.

Next, reference is made to the measurement of the fluorescent light with the fluorescence spectrophotometer 20. The specimen 30 for the measurement of the fluorescent light is placed in the specimen chamber 24. In the excitation light 34 emitted from the xenon lamp 26, for example, the spectrum of light with a center wavelength of 365 nm and a wavelength width of 10 nm is produced by the excitation light diffraction grating 27. This excitation light is reflected by the mirror 28, passes through the excitation light exit window 29, and enters the specimen chamber 24 to irradiate the specimen 30.

In the excitation light 34 with which the specimen 30 is irradiated, part of the light is absorbed by the specimen 30 and the fluorescent light is made to emanate from the specimen 30 by the energy of the absorbed excitation light 34. The fluorescent light 35 emanating from the specimen 30 passes through the fluorescence entrance window 31 and enters the fluorescence optical system 25. The fluorescent light 35 is dispersed to a specific wavelength (for example, of wavelength 500 nm) by the fluorescence diffraction grating 32. The fluorescence diffraction grating 32 is operated to change the angle of incidence of the fluorescent light 35 on the fluorescence diffraction grating 32. In this way, the wavelength of the light incident on the photomultiplier tube 33 is changed.

The dispersed light produced by the fluorescence diffraction grating 32 is incident on the photomultiplier tube 33 so that the intensity of the light is converted into the electric current. The intensity of the light converted into the electric current by the photomultiplier tube 33 is displayed and analyzed by the control and analysis section 22. When the data of the intensities of the fluorescent light are gathered in accordance with wavelengths, the spectrum of the fluorescent light expressing the intensity of the fluorescent light with respect to the wavelength of the fluorescent light is obtained.

In the fluorescence spectrophotometer of the prior art, the auto-fluorescence is generated from the excitation light exit window 29 through which the specimen is irradiated with the excitation light 34. In addition, the scattered light of the excitation light 34 with which the specimen 30 is irradiated is incident on the excitation light exit window 29 and the fluorescence entrance window 31 to generate the auto-fluorescence. Such auto-fluorescence increases the value of the background in the measurement and brings about the difficulty of the measurement requiring a high degree of accuracy, such as the measurement of the intensity of feeble fluorescent light.

In contrast to this, the fluorescence spectrophotometer 20 of the present embodiment uses the optical glass of Embodiment 1 for the excitation light exit window 29 and the fluorescence entrance window 31. Whereby, the intensities of the auto-fluorescence generated from these windows can be lowered. Hence, the value of the background of the measurement can be made small. Consequently, even in the fluorescent light with very low intensity, it is possible to make the measurement with a high degree of accuracy.

Also, the optical apparatus of the present invention is not limited to the above embodiments, and in other optical apparatuses as well, when the optical glass of the present embodiment is used, the same effect is brought about.

The invention claimed is:

1. An optical glass comprising a basic glass composition: that contains:

| | |
|---|---|
| $SiO_2$ | 2-10% |
| $B_2O_3$ | 5-45% |
| $La_2O_3$ | 30-60% |
| RO (R = Zn, Sr, Ba) | 0-15% |
| $Ln_2O_3$ (Ln = Y, Gd) | 0-40%, and |
| $ZrO_2 + Nb_2O_5 + Ta_2O_5$ | 0-30% by weight. | wherein the optical glass further comprises a substance A that generates light of a wavelength λ2 when irradiated with light of a wavelength λ1 and a substance B that generates light of a wavelength λ3 when irradiated with light of the wavelength λ1, where λ1 <λ2 <λ3, wherein the substance A is one of $As_2O_3$, $Sb_2O_3$, $V_2O_5$, CuO, $CeO_2$, platinum and antimony, and wherein the substance B is Fe, and a Fe content is 5-50 ppm with respect to 100% of the basic glass composition.

2. The optical glass according to claim 1, wherein the wavelength λ3 satisfies a condition, λ3≧750 nm.

3. The optical glass according to claim 1, further comprising 0.01-1% at least one of $Sb_2O_3$, chloride, sulfide, and fluoride, by weight, as an antifoaming agent, with respect to 100% of the basic glass composition.

4. The optical glass according to claim 1, further comprising 0-10% at least one of $Li_2O$, $Na_2O$, $K_2O$, $Rb_2O$, and $Cs_2O$, by weight.

5. An optical apparatus provided with an optical system having the optical glass according to claim 1.

* * * * *